United States Patent
Jinno et al.

(10) Patent No.: US 12,081,029 B2
(45) Date of Patent: Sep. 3, 2024

(54) POWER GENERATION CONTROL SYSTEM AND POWER GENERATION CONTROL METHOD

(71) Applicant: HONDA MOTOR CO., LTD., Tokyo (JP)

(72) Inventors: Tatsuya Jinno, Wako (JP); Yoshiaki Kotani, Wako (JP); Kohei Okaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 17/900,917

(22) Filed: Sep. 1, 2022

(65) Prior Publication Data
US 2023/0102236 A1 Mar. 30, 2023

(30) Foreign Application Priority Data
Sep. 24, 2021 (JP) ................................ 2021-156066

(51) Int. Cl.
| | |
|---|---|
| *H02J 1/10* | (2006.01) |
| *G06Q 50/06* | (2012.01) |
| *H02J 3/38* | (2006.01) |
| *H02J 7/34* | (2006.01) |

(52) U.S. Cl.
CPC ............... *H02J 3/38* (2013.01); *G06Q 50/06* (2013.01); *H02J 1/106* (2020.01); *H02J 7/34* (2013.01)

(58) Field of Classification Search
CPC .. G06Q 50/06; H02J 1/10; H02J 1/106; H02J 1/12; H02J 3/38; H02J 3/381; H02J 3/46; H02J 3/466; H02J 7/34; H02J 2300/40
See application file for complete search history.

(56) References Cited

U.S. PATENT DOCUMENTS

| | | | | |
|---|---|---|---|---|
| 6,144,115 A | * | 11/2000 | Massie ...................... | H02J 1/10 307/115 |
| 9,985,440 B1 | * | 5/2018 | Okamura .................. | H02J 5/00 |
| 2009/0115252 A1 | * | 5/2009 | Caraghiorghiopol ..... | H02J 1/10 307/48 |
| 2009/0217060 A1 | * | 8/2009 | Tsuchiya ................... | H02J 1/10 713/300 |
| 2017/0346297 A1 | * | 11/2017 | Chuang ..................... | H02J 4/00 |
| 2018/0183240 A1 | * | 6/2018 | Kuwahara ............... | H02J 3/381 |
| 2018/0287392 A1 | * | 10/2018 | Maedako .................. | H02J 3/46 |

(Continued)

FOREIGN PATENT DOCUMENTS

JP 2017-171127 A 9/2017

*Primary Examiner* — Levi Gannon
(74) *Attorney, Agent, or Firm* — WHDA, LLP

(57) ABSTRACT

A power generation control system comprises: a setting unit configured to set a control mode corresponding to a use condition of a user who uses a first power supply apparatus and a second power supply apparatus; a calculation unit configured to calculate a total load obtained by adding output power of the first power supply apparatus and output power of the second power supply apparatus; a determination unit configured to determine a load level of the total load based on a comparison between the total load and a load threshold; and a control unit configured to select a power supply apparatus corresponding to the load level among the first power supply apparatus and the second power supply apparatus based on the control mode, and cause the power supply apparatus to supply power.

18 Claims, 9 Drawing Sheets

(56) References Cited

U.S. PATENT DOCUMENTS

| | | | |
|---|---|---|---|
| 2019/0199121 A1* | 6/2019 | Lin | H02J 7/1423 |
| 2019/0305562 A1* | 10/2019 | Begino, III | H02J 3/46 |
| 2020/0127581 A1* | 4/2020 | Chen | H02J 3/28 |
| 2020/0160461 A1* | 5/2020 | Kaniki | H02J 7/0013 |
| 2021/0281077 A1* | 9/2021 | Cai | G06Q 50/06 |

* cited by examiner

POWER GENERATION CONTROL SYSTEM AND POWER GENERATION CONTROL METHOD

CROSS-REFERENCE TO RELATED APPLICATION(S)

This application claims priority to and the benefit of Japanese Patent Application No. 2021-156066 filed on Sep. 24, 2021, the entire disclosure of which is incorporated herein by reference.

BACKGROUND OF THE INVENTION

Field of the Invention

The present invention relates to a power generation control system and a power generation control method.

Description of the Related Art

Japanese Patent Laid-Open No. 2017-171127 discloses a configuration of a power generation control system in which a control device controls a first generator and a second generator using an engine as a power source. In a system that performs parallel operation control in a plurality of generators using an engine as a power source, the engine used as the power source is always in an operating state in order to maintain a state in which power can be output regardless of a load. Therefore, even in a case where the power required by the load is lower than that of a rated output of the system and there is a margin in the operating states of the plurality of generators, the parallel operation is performed while maintaining the operating state of the engine.

However, in the operation of the power generation control system, it is necessary to control the output of each generator according to the use condition intended by the user. For example, it is preferable that a generator (power supply apparatus) corresponding to a load level be selected based on a control mode corresponding to a use condition of a user, and power be supplied from the selected power supply apparatus, from the viewpoint of running cost related to suppression of fuel consumption and power generation cost, the viewpoint of quietness during the operation of the generator in consideration of the surrounding environment, the viewpoint of output power for securing the amount of power required on the load side, and the like.

In view of the above problems, the present invention provides a power generation control technology capable of selecting a power supply apparatus corresponding to a load level based on a control mode corresponding to a use condition of a user and supplying power from the selected power supply apparatus.

SUMMARY OF THE INVENTION

According to one aspect of the present invention, there is provided a power generation control system including a first power supply apparatus and a second power supply apparatus capable of supplying power to electrical equipment, the power generation control system comprising: a setting unit configured to set a control mode corresponding to a use condition of a user who uses the first power supply apparatus and the second power supply apparatus; a calculation unit configured to calculate a total load obtained by adding output power of the first power supply apparatus and output power of the second power supply apparatus; a determination unit configured to determine a load level of the total load based on a comparison between the total load and a load threshold; and a control unit configured to select a power supply apparatus corresponding to the load level among the first power supply apparatus and the second power supply apparatus based on the control mode, and cause the power supply apparatus to supply power.

According to the present invention, a power supply apparatus corresponding to a load level can be selected based on a control mode corresponding to a use condition of a user and power can be supplied from the selected power supply apparatus.

DESCRIPTION OF THE EMBODIMENTS

Figure 1:
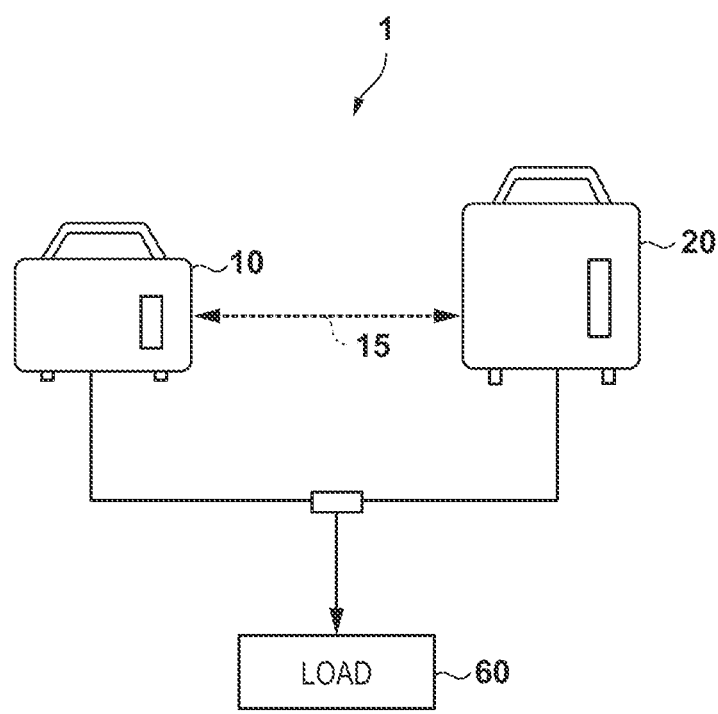
FIG. 1 is a schematic diagram of a power generation control system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

[Configuration of Power Generation Control System]

FIG. 1 is a schematic diagram of a power generation control system 1. The power generation control system 1 includes a first power supply apparatus 10 (first power generation apparatus) and a second power supply apparatus 20 (second power generation apparatus) capable of supplying power to electrical equipment. I/F units 33 of the first power supply apparatus 10 and the second power supply apparatus 20 can mutually transmit and receive data via a communication network 15. Although the first power supply apparatus 10 and the second power supply apparatus 20 are illustrated in an example illustrated in the drawings, three or more power supply apparatuses may be connected to the communication network 15 to configure the power generation control system 1 in addition to this configuration. The I/F units 33 of the first power supply apparatus 10 and the second power supply apparatus 20 can acquire power information including an output current and an output voltage of each power supply apparatus by communication via the communication network 15. Various communication methods can be applied for the communication network 15, including wired communication or wireless communication. The I/F unit 33 may support, for example, communication by a controller area network (CAN) or near field communication such as Bluetooth (registered trademark) as a communication method. Further, the I/F unit 33 may support cellular communication or the like.

Among the first power supply apparatus 10 and the second power supply apparatus 20, the power supply apparatus started earlier is referred to as a master power supply apparatus (master generator), and the power supply apparatus started later is referred to as a slave power supply apparatus (slave generator). In the parallel operation control of the present embodiment, a control circuit 30 of the master power supply apparatus is a main body of control processing, and controls the operation of the master power supply apparatus. In addition, the control circuit 30 of the master power supply apparatus generates a control signal for controlling the operation of the slave power supply apparatus, and transmits the control signal to the slave power supply apparatus via the communication network 15. A control device of the slave power supply apparatus controls the operation of the slave power supply apparatus based on the received control signal.

The first power supply apparatus 10 and the second power supply apparatus 20 are apparatuses that supply power to electrical equipment (a load), and though a portable power supply apparatus is assumed in the case of the present embodiment, they may be stationary power supply apparatuses. In the case of the portable power supply apparatus, it can be transported to a use site according to the use of the user, such as leisure, business, or emergency. The power generation control system 1 of the present embodiment selects a power supply apparatus corresponding to a required load level based on a control mode corresponding to a use condition of a user, and supplies power from the selected power supply apparatus.

Configuration Example of First Power Supply Apparatus 10

Figure 2:
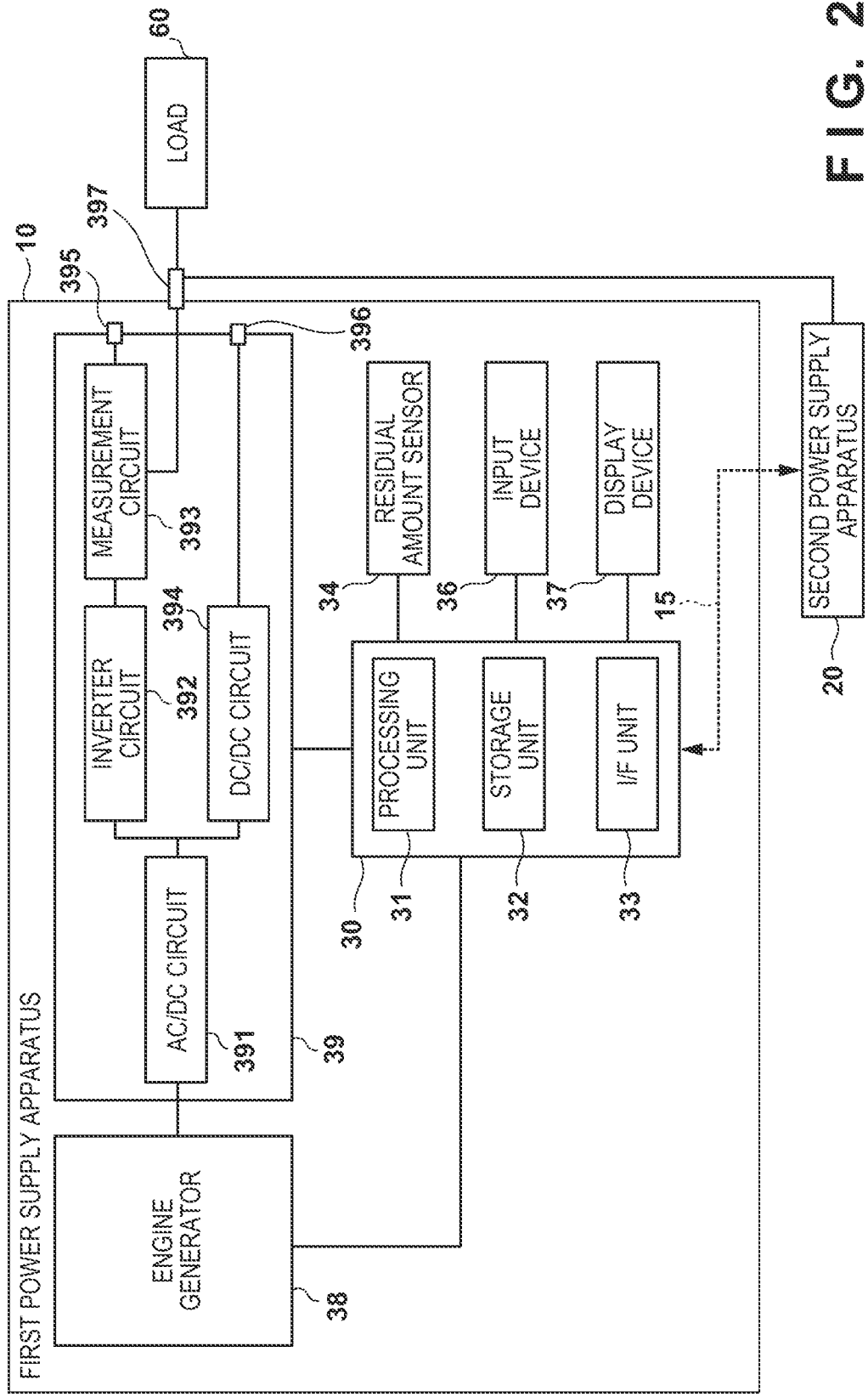
FIG. 2 is a block diagram illustrating a configuration example of a first power supply apparatus according to an embodiment.

FIG. 2 is a block diagram illustrating a configuration example of the first power supply apparatus 10. The first power supply apparatus 10 of the present embodiment is a generator type power supply apparatus including an engine generator 38 as a power source. The engine generator 38 of the present embodiment is driven by fuel to generate AC power. The fuel is, for example, gasoline, liquefied petroleum gas, hydrogen, or the like.

A power supply circuit 39 is a circuit that converts a voltage generated by the engine generator 38 into a predetermined AC or DC. An AC/DC circuit 391 includes a rectifying and smoothing circuit that rectifies and smooths the AC generated by the engine generator 38. An inverter circuit 392 is a circuit that converts a DC output from the AC/DC circuit 391 into a stable AC of a predetermined frequency.

A measurement circuit 393 includes a current sensor and a voltage sensor, measures an AC voltage and an AC current supplied from the inverter circuit 392 to a load such as electrical equipment connected to an AC interface unit 395, and outputs a measurement result to the control circuit 30. A load such as electrical equipment that can be driven by AC power is detachably connected to the AC interface unit 395.

In addition, when the first power supply apparatus 10 and the second power supply apparatus 20 are operated in parallel, the first power supply apparatus 10 and the second power supply apparatus 20 are connected to a comprehensive interface unit 397. Further, a load 60 that can be driven by AC power is detachably connected to the comprehensive interface unit 397. The AC converted by the inverter circuit 392 is output from the comprehensive interface unit 397 to the load 60. Here, the load 60 is a load to which the first power supply apparatus 10 and the second power supply apparatus 20 operating in parallel supply power, and may be, for example, single electrical equipment or a load to supply power to a plurality of electrical equipment units or the like.

A DC/DC circuit 394 can convert the level of the DC voltage output from the AC/DC circuit 391, supply an operating voltage to the control circuit 30 and the like, and output the operating voltage from a DC interface unit 396. The electrical equipment that can be driven by DC power is detachably connected to the DC interface unit 396.

The control circuit 30 (first control circuit) is a circuit that controls the first power supply apparatus 10. The control circuit 30 includes a processing unit 31, a storage unit 32, and an interface (I/F) unit 33. The processing unit 31 is a processor represented by a CPU, and executes a program stored in the storage unit 32. The storage unit 32 is a storage device such as a RAM, a ROM, or a hard disk. The storage unit 32 stores various types of data in addition to a program executed by the processing unit 31. In addition, the storage unit 32 stores data of information items on the first power supply apparatus 10 and the second power supply apparatus 20. The storage unit 32 stores, for example, the cost of fuel for driving the engine generator 38 and the conversion efficiency for converting the fuel into electricity as the information regarding the first power supply apparatus 10. In addition, the storage unit 32 stores, for example, the cost required for charging a storage battery 38' and the charge-discharge efficiency of the storage battery 38' as the information regarding the second power supply apparatus 20.

The processing unit 31 of the control circuit 30 (first control circuit) calculates the running cost of the first power supply apparatus 10 using the cost of the fuel for driving the engine generator 38 acquired from the storage unit 32 and the conversion efficiency for converting the fuel into electricity in the comparison of the running costs in FIG. 9A to be described later.

In addition, the processing unit 31 calculates the running cost of the second power supply apparatus using the cost required for charging the storage battery 38' acquired from the storage unit 32 and the charge-discharge efficiency of the storage battery 38'.

The acquisition of the running cost is not limited to calculation processing using parameters, and may be stored in the storage unit 32 as a database, and the processing unit 31 of the control circuit 30 (first control circuit) may acquire the running cost from the database. In addition, it is also possible to download the running cost corresponding to a model from the database on the cloud via the communication network 15 and store the running cost in the storage unit 32.

The I/F unit 33 relays transmission and reception of signals to and from the second power supply apparatus 20 via the communication network 15. The I/F unit 33 can acquire power information including the output current and the output voltage of the second power supply apparatus 20 via the communication network 15. The storage unit 32 can store information acquired from the second power supply apparatus 20 via the communication network 15.

A residual amount sensor 34 detects the remaining amount of fuel in the engine generator 38. The residual amount sensor 34 can be provided in a fuel tank that stores fuel. The processing unit 31 can calculate fuel consumption of the engine generator 38 from the fuel consumption detected by the residual amount sensor 34 and the power consumption of electrical equipment 6 measured by the measurement circuit 393.

An input device 36 is a device that receives an operation input of the user of the first power supply apparatus 10, and is, for example, a plurality of switches. A display device 37 is a device that displays information to the user of the first power supply apparatus 10, and is, for example, an image display device such as a liquid crystal display device or a light emitting element such as an LED. The display device 37 includes, for example, a display unit including a graphical user interface (GUI) such as a touch panel, and inputs an instruction from the user to the first power supply apparatus 10.

The processing unit 31 (first processing unit) acquires the detection result of the residual amount sensor 34 and the measurement result of the measurement circuit 393 as the output power of the first power supply apparatus 10. In addition, the processing unit 31 acquires power information including the output current and the output voltage of the second power supply apparatus 20 as the output power of the second power supply apparatus 20 by communication of the I/F unit 33. The processing unit 31 calculates the total load obtained by adding the output power of the first power supply apparatus 10 and the output power of the second power supply apparatus 20 using the output powers. This configuration is similar to the processing of a control circuit 30' in the second power supply apparatus 20.

In addition, the I/F unit 33 acquires information (SOC: State Of Charge) indicating a charge state of the storage battery 38' in the second power supply apparatus 20 from the second power supply apparatus 20. The information indicating the charge state includes information such as a charge rate and a capacity of the storage battery 38' at the time of full charge.

In a case where the first power supply apparatus 10 functions as the master power supply apparatus, the processing unit 31 of the control circuit 30 generates a control signal for controlling the operation of the slave power supply apparatus, and the I/F unit 33 transmits the generated control signal to the second power supply apparatus 20 functioning as the slave power supply apparatus.

In addition, in a case where the first power supply apparatus 10 functions as the slave power supply apparatus, the processing unit 31 of the control circuit 30 in the first power supply apparatus 10 controls the operation of the first power supply apparatus 10 based on the control signal received by the I/F unit 33 from the master power supply apparatus (second power supply apparatus 20).

Configuration Example of Second Power Supply Apparatus 20

Figure 3:
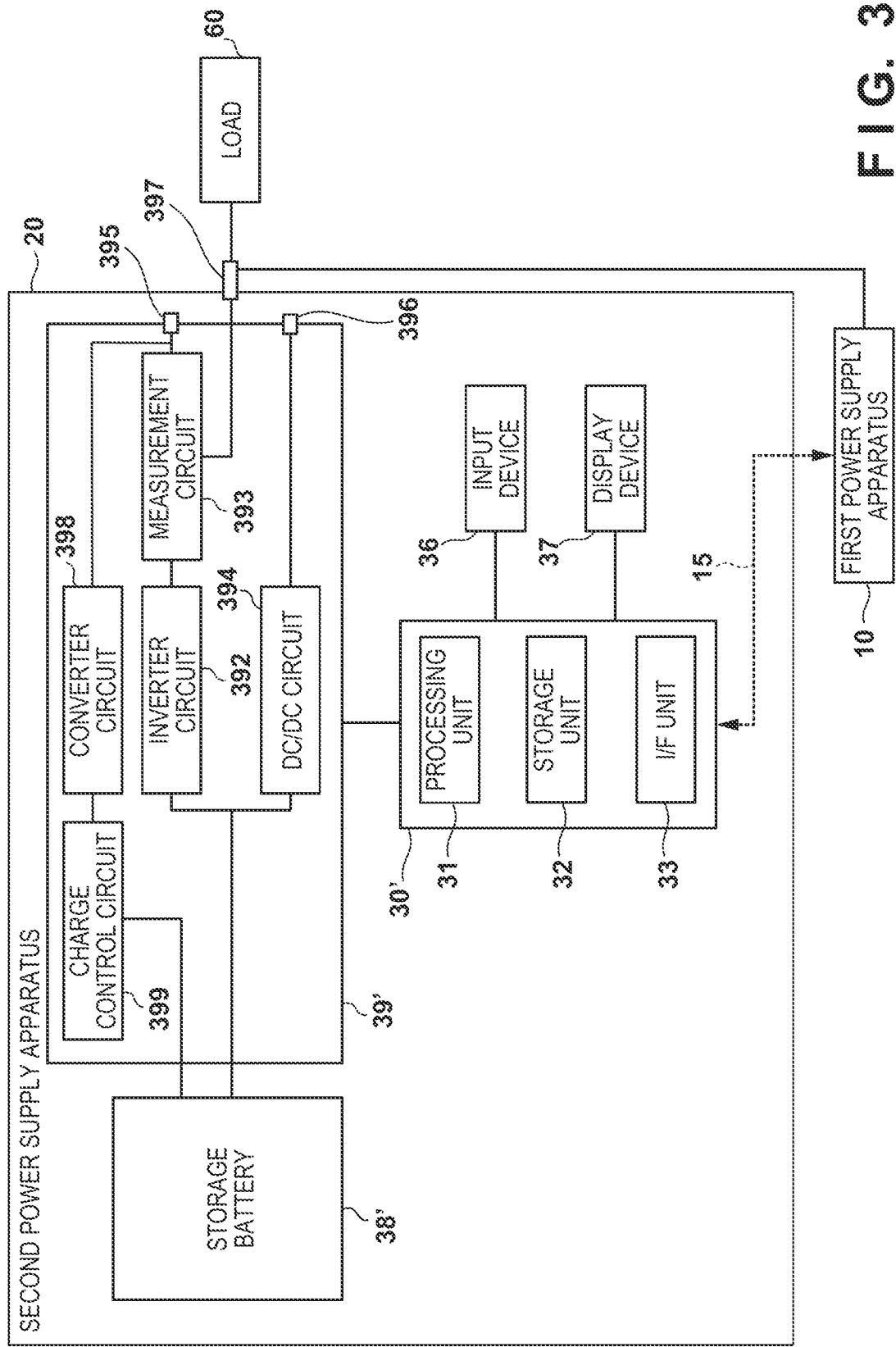
FIG. 3 is a block diagram illustrating a configuration example of a second power supply apparatus according to an embodiment.

FIG. 3 is a block diagram illustrating a configuration example of the second power supply apparatus 20. The second power supply apparatus 20 of the present embodiment is a generator type power supply apparatus employing the storage battery 38' as a power source. The storage battery 38' is, for example, a secondary battery such as a lithium ion battery, and outputs a DC voltage such as 48 V to the inverter circuit 392 or the DC/DC circuit 394.

A power supply circuit 39' is a circuit that converts a DC supplied from the storage battery 38' into a predetermined AC or DC. The inverter circuit 392 is a circuit that converts a DC supplied from the storage battery 38' into a stable AC of a predetermined frequency.

The measurement circuit 393 includes a current sensor and a voltage sensor, measures an AC voltage and an AC current supplied from the inverter circuit 392 to the electrical equipment 6 connected to an AC interface unit 395, and outputs a measurement result to the control circuit 30. The electrical equipment 6 that can be driven by AC power is detachably connected to the AC interface unit 395. In addition, when the storage battery 38' is charged, an external power supply is connected to the AC interface unit 395.

A converter circuit 398 is a circuit that converts AC supplied from an external power supply into DC in a case where the AC is supplied from the external power supply via the AC interface unit 395.

A charge control circuit 399 is a circuit that generates DC output from the converter circuit 398 as DC of a predetermined voltage. The charge control circuit 399 outputs the generated DC to the storage battery 38' to charge the storage battery 38'. A charge control circuit 399 acquires the information (SOC) indicating a charge state of the storage battery 38', and outputs the information to the control circuit 30. The I/F unit 33 of the control circuit 30 transmits the information (SOC) indicating the charge state of the storage battery 38' to the first power supply apparatus 10 via the communication network 15. Accordingly, the information (SOC) indicating the charge state of the storage battery 38' is shared between the second power supply apparatus 20 and the first power supply apparatus 10.

In addition, when the first power supply apparatus 10 and the second power supply apparatus 20 are operated in parallel, the first power supply apparatus 10 and the second power supply apparatus 20 are connected to a comprehensive interface unit 397. Further, a load 60 that can be driven by AC power is detachably connected to the comprehensive interface unit 397. The AC converted by the inverter circuit 392 is output from the comprehensive interface unit 397 to the load 60.

The DC/DC circuit 394 can convert the level of the DC voltage supplied from the storage battery 38', supply an operating voltage to the control circuit 30 and the like, and output the operating voltage from a DC interface unit 396. The electrical equipment that can be driven by DC power is detachably connected to the DC interface unit 396.

The control circuit 30' (second control circuit) is a circuit that controls the second power supply apparatus 20. The control circuit 30' includes the processing unit 31, the storage unit 32, and the interface (I/F) unit 33. The processing unit 31 is a processor represented by a CPU, and executes a program stored in the storage unit 32. The storage unit 32 is a storage device such as a RAM, a ROM, or a hard disk. The storage unit 32 stores various types of data in addition to a program executed by the processing unit 31. In addition, the storage unit 32 stores data of information items on the first power supply apparatus 10 and the second power supply apparatus 20. The storage unit 32 stores, for example, the cost of fuel for driving the engine generator 38 and the conversion efficiency for converting the fuel into electricity as the information regarding the first power supply apparatus 10. In addition, the storage unit 32 stores, for example, the cost required for charging a storage battery 38' and the charge-discharge efficiency of the storage battery 38' as the information regarding the second power supply apparatus 20.

The processing unit 31 of the control circuit 30' (second control circuit) calculates the running cost of the first power supply apparatus 10 using the cost of the fuel for driving the engine generator 38 acquired from the storage unit 32 and the conversion efficiency for converting the fuel into electricity in the comparison of the running costs in FIG. 9A described later.

In addition, the processing unit 31 calculates the running cost of the second power supply apparatus using the cost required for charging the storage battery 38' acquired from the storage unit 32 and the charge-discharge efficiency of the storage battery 38'.

The I/F unit 33 relays transmission and reception of signals to and from the first power supply apparatus 10 via the communication network 15. The I/F unit 33 can acquire power information including the output current and the output voltage of the first power supply apparatus 10 via the communication network 15. The storage unit 32 can store information acquired from the first power supply apparatus 10 via the communication network 15.

The processing unit 31 (second processing unit) of the control circuit 30' acquires the measurement result of the measurement circuit 393 as the output power of the second power supply apparatus 20. In addition, the processing unit 31 acquires power information including the output current and the output voltage of the first power supply apparatus 10 acquired from the I/F unit 33 as the output power of the first power supply apparatus 10. The processing unit 31 calculates the total load obtained by adding the output power of the second power supply apparatus 20 and the output power of the first power supply apparatus 10 using the output powers. This configuration is similar to the processing of the control circuit 30 in the first power supply apparatus 10.

In a case where the second power supply apparatus 20 functions as the master power supply apparatus, the processing unit 31 of the control circuit 30' generates a control signal for controlling the operation of the slave power supply apparatus, and the I/F unit 33 transmits the generated control signal to the first power supply apparatus 10 functioning as the slave power supply apparatus.

In addition, in a case where the second power supply apparatus 20 functions as the slave power supply apparatus, the processing unit 31 of the control circuit 30' controls the operation of the second power supply apparatus 20 based on the control signal received by the I/F unit 33 from the master power supply apparatus (first power supply apparatus 10).

Setting Processing Example of Control Mode

Figure 4:
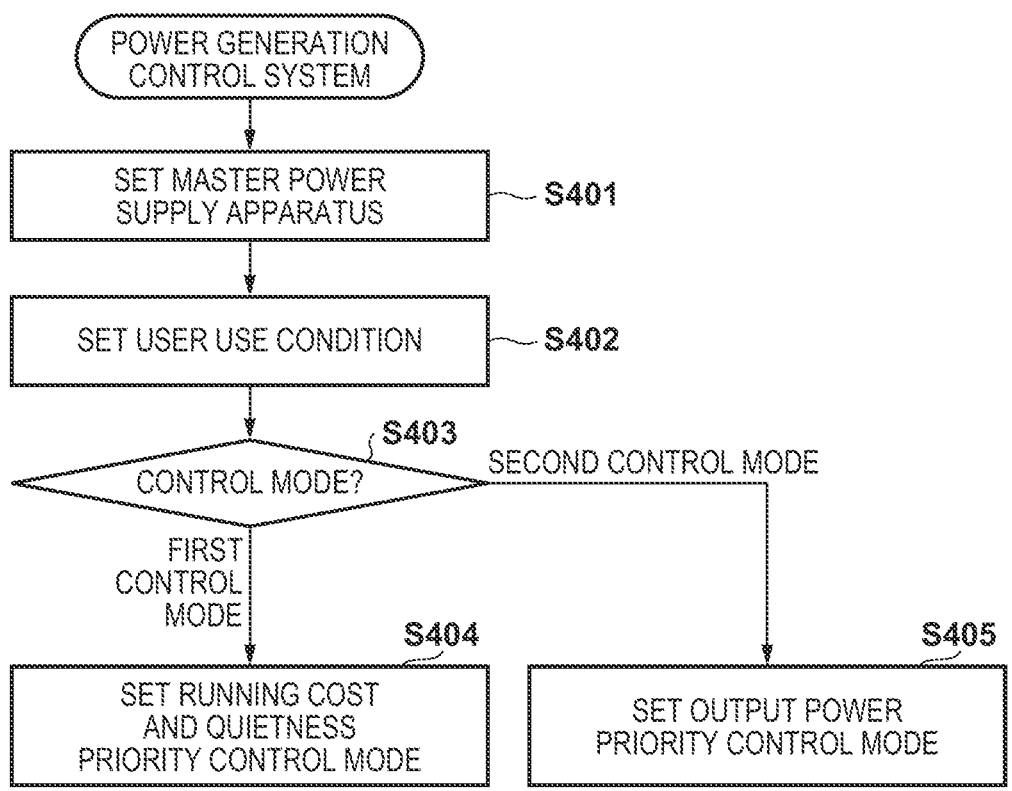
FIG. 4 is a flowchart for illustrating a flow of processing of setting a control mode.

A setting processing example of the control mode in the power generation control system 1 will be described. FIG. 4 illustrates a flow of processing of setting the control mode corresponding to a use condition of a user who uses the first power supply apparatus 10 and the second power supply apparatus 20, and the processing unit 31 of the master power supply apparatus mainly executes this processing.

In step S401, a master power supply apparatus is set. In the present embodiment, a processing example in a case where among the first power supply apparatus 10 and the second power supply apparatus 20, the first power supply apparatus 10 is activated first and the second power supply apparatus 20 is activated later will be described. That is, the first power supply apparatus 10 functions as a master power supply apparatus (master generator), and the second power supply apparatus 20 functions as a slave power supply apparatus (slave generator).

Note that the setting of the master power supply apparatus is exemplary, and the activation order may be reversed. That is, the processing of the present embodiment can be applied even when the second power supply apparatus 20 functions as a master power supply apparatus (master generator) and the first power supply apparatus 10 functions as a slave power supply apparatus (slave generator).

In step S402, the user sets a control mode corresponding to the use condition of the user via the GUI displayed on the display device 37. Here, the control mode includes two control modes of a first control mode and a second control mode. The first control mode and the second control mode are displayed on a menu screen of the GUI as candidates of the control mode, and the user selects one of the first control mode and the second control mode on a touch panel of the GUI to set the control mode corresponding to the use condition of the user.

Here, the first control mode is a control mode in which priority is given to running cost and priority is given to quietness. The first control mode is a control mode in which the power generation control system 1 is operated by preferentially using a power supply apparatus adopting a storage battery (battery) as a power source. In the first control mode, since the power supply apparatus adopting the storage battery (battery) as the power source is preferentially used, the influence of driving sound of the engine is reduced as compared with the use of the second control mode (power supply apparatus adopting the engine as the power source). Therefore, the first control mode is a control mode excellent in quietness as compared with the second control mode.

In addition, the second control mode is an output power-prioritized control mode. The second control mode is a control mode in which the power generation control system 1 is operated by preferentially using a power supply apparatus adopting an engine as a power source.

Since the selection of the user on the GUI is shared between the apparatus by communication via the I/F unit 33, the user may select the control mode from the display device 37 of the master-side first power supply apparatus 10 or may select the control mode from the display device 37 of the slave-side second power supply apparatus 20.

In step S403, the processing unit 31 in the control circuit 30 of the first power supply apparatus 10 determines whether the control mode set in step S402 is the first control mode or the second control mode.

In a case where the set control mode is the first control mode, the processing unit 31 advances the processing to step S404. Then, in step S404, the processing unit 31 sets the processing (FIG. 5) corresponding to the first control mode as the control mode for operating the power generation control system 1.

In addition, in a case where the control mode set in step S402 is the second control mode, the processing proceeds to S405. Then, in step S405, the processing unit 31 sets the processing (FIG. 7) corresponding to the second control mode as the control mode for operating the power generation control system 1. The processing unit 31 changes the processing flow according to the set control mode.

[Processing in First Control Mode]
(Selection of Power Supply Apparatus)

Figure 6:
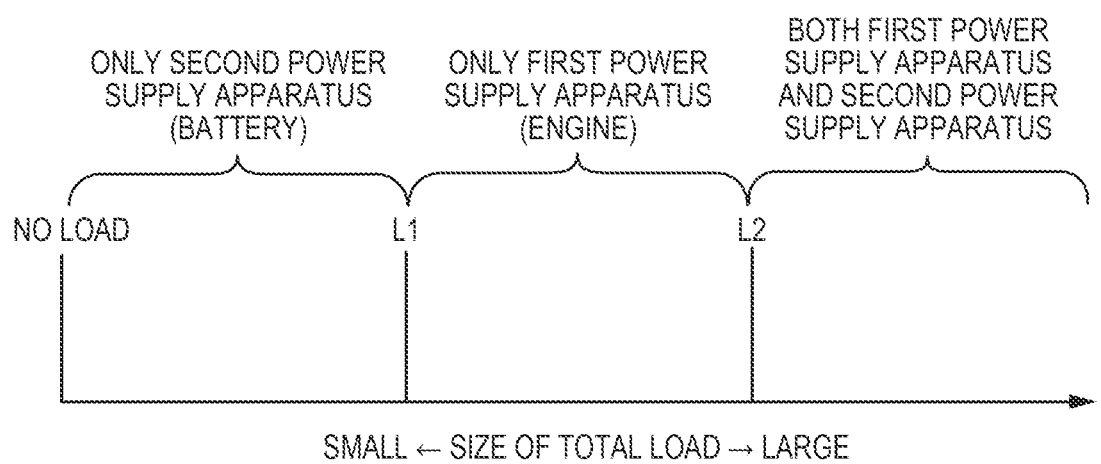
FIG. 6 is a diagram illustrating selection of a power supply apparatus according to a magnitude of a total load.

FIG. 6 is a diagram illustrating selection (allocation) of the power supply apparatus according to the magnitude of the total load in the first control mode. In FIG. 6, L1 and L2 are thresholds of a load for selecting the power supply apparatus. L1 is a first load threshold, and L2 is a second load threshold larger than the first load threshold L1 (L2>L1).

The first load threshold L1 indicates a load branch point at which the magnitude relationship of the running cost changes between the first power supply apparatus 10 and the second power supply apparatus 20, and the second load threshold L2 indicates an upper limit load of the output power of the first power supply apparatus 10.

Only the second power supply apparatus 20 is selected in a range where the total load is equal to or less than the first load threshold L1 from a range where no load is connected (no load). In addition, only the first power supply apparatus 10 is selected in a range the total load is from the first load threshold L1 to the second load threshold L2 or less. In a range where the total load exceeds the second load threshold L2, both the first power supply apparatus 10 and the second power supply apparatus 20 are selected.

(Relationship Between Running Cost and Load of Each Power Supply Apparatus)

Figure 9A:
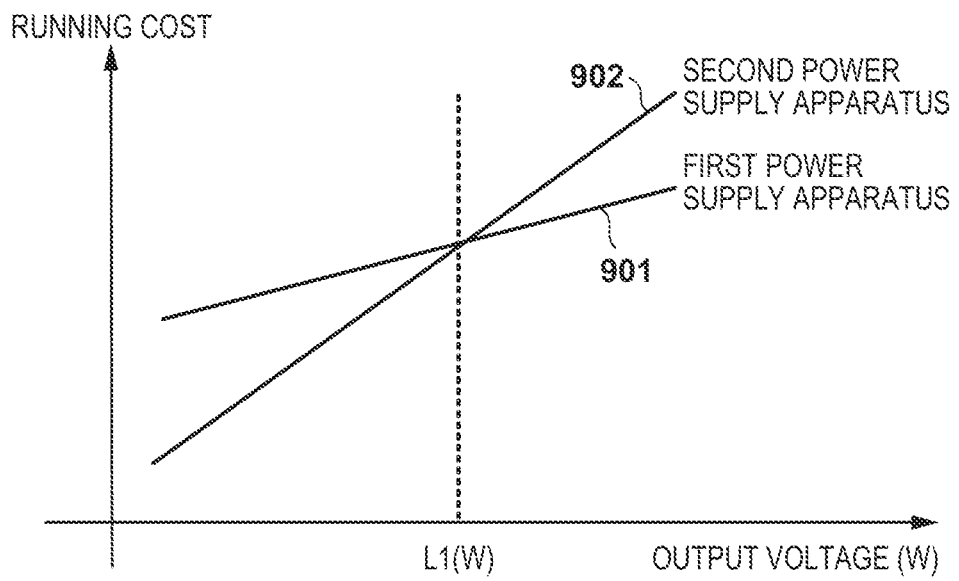
FIG. 9A is a diagram schematically illustrating a relationship between a running cost and an output power of each power supply apparatus and FIG. 9B is a diagram schematically illustrating switching of the output of each power supply apparatus based on the change in the total load.

FIG. 9A is a diagram schematically illustrating a relationship between a running cost and output power of each power supply apparatus. In the range (region) equal to or less than the first load threshold L1, a running cost 902 of the second power supply apparatus 20 is set lower than a running cost 901 of the first power supply apparatus 10.

Here, the running cost 902 of the second power supply apparatus 20 is acquired based on parameters including an electric bill (cost) required for charging the storage battery 38' (battery) and charge-discharge efficiency. In addition, the running cost 901 of the first power supply apparatus 10 is acquired based on parameters including a price (cost) for purchasing fuel (for example, gasoline or the like) for driving the engine generator 38 and conversion efficiency for converting the fuel into electricity.

By comparing the running cost 901 of the first power supply apparatus 10 and the running cost 902 of the second power supply apparatus 20 and supplying power by the operation of the power supply apparatus having the lower running cost, the running cost of the entire power generation control system 1 can be reduced.

As illustrated in FIG. 9A, in the range equal to or less than the first load threshold L1, the running cost 902 of the second power supply apparatus 20 is lower than the running cost 901 of the first power supply apparatus 10. Therefore, in the first control mode, in a range when the total load is in the range from no load to equal to or less than the first load threshold L1, only the second power supply apparatus 20 is selected as illustrated in FIG. 6.

In addition, in a range where the total load is from the first load threshold L1 to equal to or less than the second load threshold L2 (In FIGS. 9A and 9B, L2 is omitted), the running cost of the first power supply apparatus 10 is set lower than the running cost of the second power supply apparatus 20. Therefore, in the first control mode, in a range where the total load is in the range from no load to the first load threshold L1 to the second load threshold L2 or less, only the first power supply apparatus 10 is selected as illustrated in FIG. 6.

In a range exceeding the second load threshold L2 indicating the upper limit load of the output power of the first power supply apparatus 10, both the first power supply apparatus 10 and the second power supply apparatus 20 are selected as illustrated in FIG. 6.

(Relationship Between Switching of Output and Load of Each Power Supply Apparatus)

Figure 9B:
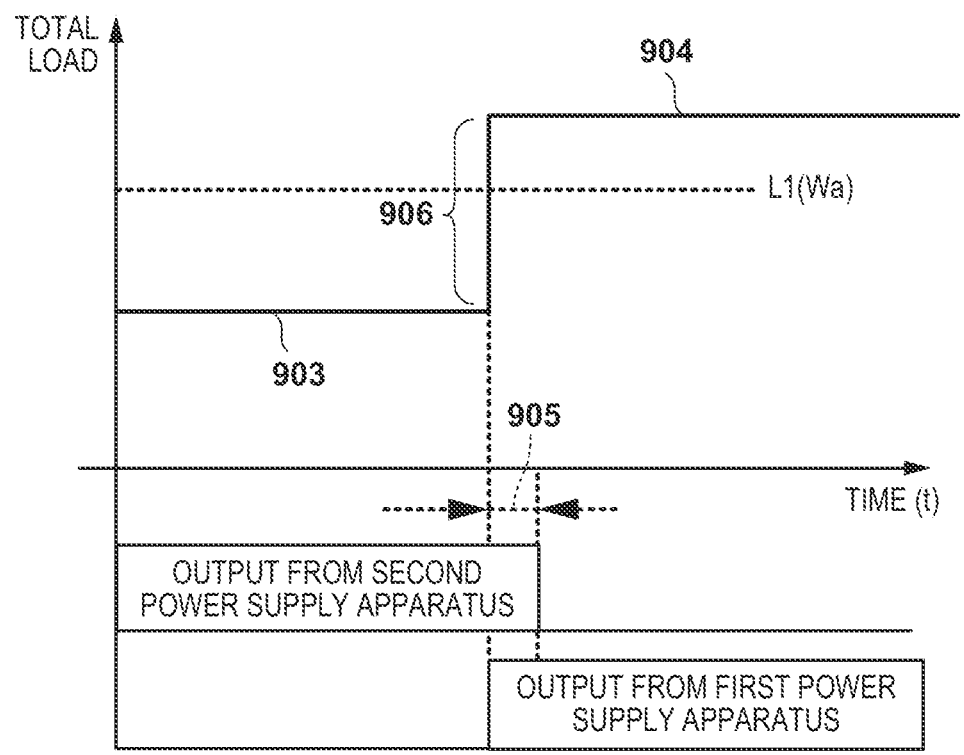

FIG. 9B is a diagram schematically illustrating switching of the output of each power supply apparatus based on the change in the total load. In FIG. 9B, the total load 903 indicates a load lower than that of the first load threshold L1, and the total load 904 indicates a load higher than that of the first load threshold L1 and equal to or lower than the second load threshold L2.

In a case where the value of the total load changes from the total load 903 to the total load 904 during the operation in the first control mode, the processing unit 31 of the master power supply apparatus switches the selection of the power supply apparatus. That is, the processing unit 31 of the master power supply apparatus switches the selection from the second power supply apparatus 20 to the first power supply apparatus 10.

In order to suppress a state in which the output power from the power generation control system 1 becomes zero when switching the selection from the second power supply apparatus 20 to the first power supply apparatus 10, the processing unit 31 of the master power supply apparatus sets an overlapping time 905 in which a state in which power is supplied from the first power supply apparatus 10 and a state in which power is supplied from the second power supply apparatus 20 overlap with each other.

As illustrated in FIG. 9B, the processing unit 31 maintains the output from the second power supply apparatus 20 until the overlapping time 905 elapses after the output from the first power supply apparatus 10 in the state of the total load 904.

The processing unit 31 sets the overlapping time 905 according to the load difference value 906 acquired by a difference between the load (total load 904) higher than that of the first load threshold L1 and equal to or lower than that of the second load threshold L2 and the load (total load 903) lower than that of the first load threshold L1. For example, the processing unit 31 can set the overlapping time 905 to be shorter as the load difference value 906 decreases, or can set the overlapping time 905 to be longer as the load difference value 906 increases.

By setting the overlapping time 905 according to the load difference value 906, when the selection is switched from the second power supply apparatus 20 to the first power supply apparatus 10, a state in which the output power from the power generation control system 1 temporarily becomes zero can be suppressed, and power can be stably supplied.

In FIG. 9B, the case where the selection is switched from the second power supply apparatus 20 to the first power supply apparatus 10 is exemplarily described, but the same applies to the opposite case. For example, during the operation in the first control mode, in a case where the total load changes from a load (total load 904) higher than that of the first load threshold and equal to or lower than the second load threshold L2 to a load (total load 903) lower than that of the first load threshold, the processing unit 31 switches the selection from the first power supply apparatus 10 to the second power supply apparatus 20. The setting of the overlapping time in this case is similar to the case of switching the selection from the second power supply apparatus 20 to the first power supply apparatus 10.

(Flow of Processing in First Control Mode)

Figure 5:
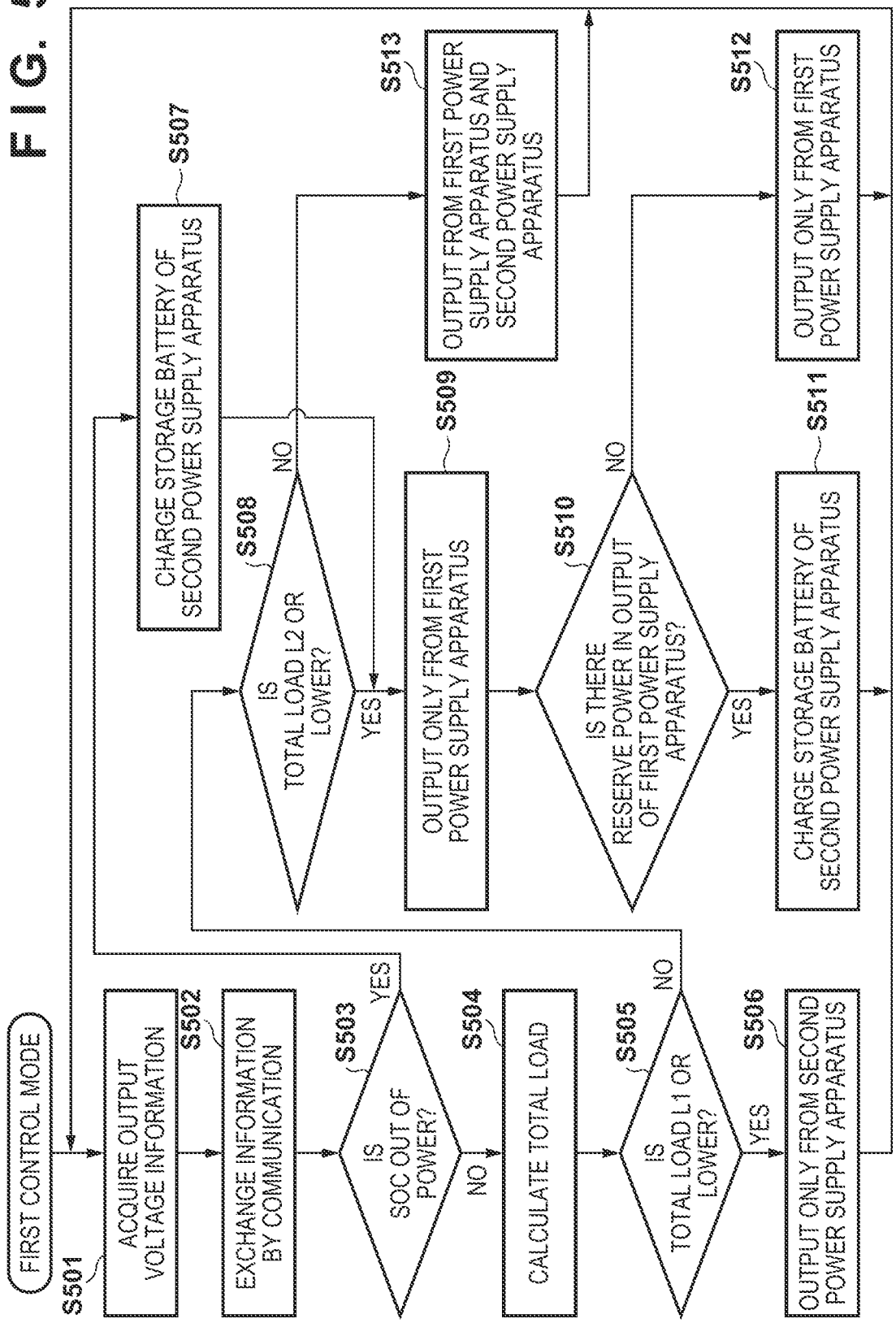
FIG. 5 is a diagram for illustrating a flow of processing in a first control mode.

FIG. 5 is a diagram for illustrating a flow of processing in a first control mode. In the present embodiment, as described in the setting processing example of the control mode in FIG. 4, the first power supply apparatus 10 functions as the master power supply apparatus (master generator), and the second power supply apparatus 20 functions as the slave power supply apparatus (slave generator). The processing unit 31 of the master power supply apparatus (first power supply apparatus 10) mainly performs the present processing.

In step S501, the processing unit 31 acquires the detection result of the residual amount sensor 34 of the first power supply apparatus 10 and the measurement result of the measurement circuit 393 as the output power of the first power supply apparatus 10.

In addition, in step S502, the processing unit 31 acquires power information including the output current and the output voltage of the second power supply apparatus 20 as the output power of the second power supply apparatus 20 by information exchange through communication of the I/F unit 33.

In step S503, the processing unit 31 acquires the information (SOC) indicating the charge state of the storage battery 38' in the second power supply apparatus 20 by communication of the I/F unit 33. The processing unit 31 determines whether the storage battery 38' is out of power based on the acquired information indicating the charge state. The processing unit 31 determines that charging is necessary when the information indicating the charge state is equal to or less than a predetermined value. In a case of determining that the storage battery 38' is out of power (requiring charge) (Yes in S503), the processing unit 31 advances the processing to step S507.

In step S507, the processing unit 31 of the first power supply apparatus 10 generates a control signal for shifting the state of the second power supply apparatus 20 to the charging mode in order to charge the storage battery 38', and transmits the generated control signal to the second power supply apparatus 20 via the I/F unit 33.

The processing unit 31 of the second power supply apparatus 20 shifts the second power supply apparatus 20 to the charging mode based on the control signal received from the first power supply apparatus 10 via the I/F unit 33. In the charging mode, the processing unit 31 of the second power supply apparatus 20 controls the display of the display device 37 so as to notify (prompt) the user to charge the storage battery 38'. For example, the processing unit 31 of the second power supply apparatus 20 can notify the user that the storage battery 38' needs to be charged by changing display color of an indicator on a display unit of the display device 37 or performing display control to blink the display of the indicator on the display unit.

When the second power supply apparatus 20 is connected to an external power supply, the converter circuit 398 converts the AC supplied from the external power supply via the AC interface unit 395 into the DC. The charge control circuit 399 outputs the DC output from the converter circuit 398 to the storage battery 38' to charge the storage battery 38'.

The processing unit 31 of the master power supply apparatus (first power supply apparatus 10) sets the storage battery 38' on the second power supply apparatus 20 side to a charge state, and advances the processing to step S509.

On the other hand, in a case of determining in step S503 that the storage battery 38' is not out of power (charge is not necessary) (No in S503), the processing unit 31 advances the processing to step S504.

In step S504, the processing unit 31 of the first power supply apparatus 10 calculates the total load obtained by adding the output power of the first power supply apparatus 10 and the output power of the second power supply apparatus 20 using the output powers.

The processing unit 31 determines the load level of the total load based on the comparison between the total load and the load threshold (first load threshold L1 or second load threshold L2), and selects, among the first power supply apparatus 10 and the second power supply apparatus 20, the power supply apparatus corresponding to the load level based on the control mode.

In step S505, the processing unit 31 compares the total load calculated in step S504 with the first load threshold L1, and in a case of determining that the calculated total load (load level of the total load) is equal to or less than the first load threshold L1 (S505—Yes), the processing proceeds to step S506.

In step S506, the processing unit 31 of the first power supply apparatus 10 selects the second power supply apparatus 20 as the power supply apparatus corresponding to the load level, generates a control signal to output power from the second power supply apparatus 20, and transmits the generated control signal to the second power supply apparatus 20 via the I/F unit 33. The processing unit 31 of the second power supply apparatus 20 controls the operation of the second power supply apparatus 20 based on the control signal received from the first power supply apparatus 10 via the I/F unit 33, and outputs the generated power.

Then, the processing unit 31 of the first power supply apparatus 10 controls the operation of the own apparatus to stop the generation of power. By the processing of this step, in the power generation control system 1, only the second power supply apparatus 20 outputs power.

After the processing of step S506, the processing returns to step S501, and the processing unit 31 repeatedly executes similar processing.

On the other hand, in the determination in step S505, in a case where the total load calculated in step S504 exceeds the first load threshold L1 (S505—No), the processing unit 31 advances the processing to step S508.

In step S508, the processing unit 31 compares the total load with the second load threshold L2, and in a case of determining that the calculated total load (load level of the total load) is equal to or less than the second load threshold L2 (S508—Yes), the processing proceeds to step S509.

In step S509, the processing unit 31 of the first power supply apparatus 10 selects the first power supply apparatus 10 as the power supply apparatus corresponding to the load level and generates a control signal to output power from the first power supply apparatus 10 (own apparatus). In addition, the processing unit 31 of the first power supply apparatus 10 generates a control signal for stopping the generation of power by the second power supply apparatus 20, and transmits the generated control signal to the second power supply apparatus 20 via the I/F unit 33. The processing unit 31 of the second power supply apparatus 20 controls the operation of the second power supply apparatus 20 based on the control signal received from the first power supply apparatus 10 via the I/F unit 33, and stops the generation of power. By the processing of this step, in the power generation control system 1, only the first power supply apparatus 10 outputs power.

In step S510, the processing unit 31 determines whether there is reserve power in the output power of the first power supply apparatus 10. For example, the processing unit 31 obtains a reserve power difference value acquired by a difference between the output power of the first power supply apparatus 10 and the second load threshold L2, and determines that there is reserve power in the output power when the reserve power difference value is equal to or larger than a predetermined value.

In a case of determining that there is reserve power in the output power (S510—Yes), the processing unit 31 advances the processing to step S511.

In step S511, in order to charge the storage battery 38', the processing unit 31 of the first power supply apparatus 10 generates a control signal for shifting the state of the second power supply apparatus 20 from the stop mode in which power generation is stopped to the charging mode for charging, and transmits the generated control signal to the second power supply apparatus 20 via the I/F unit 33. This processing is similar to the processing of step S507.

In a case where the storage battery 38' is already in the charged state in step S507, the processing unit 31 of the master power supply apparatus (first power supply apparatus 10) performs control to continue charging of the storage battery 38'.

In the determination in step S510, the case where there is the reserve power in the output power is a case where the possibility that the output power of the first power supply apparatus 10 exceeds the second load threshold L2 indicating the upper limit load is low. In such a case, by performing charging on the second power supply apparatus 20 side (S511) while outputting power on the first power supply apparatus 10 side (S509), preparation for supplying power required in a case where the total load exceeds the second load threshold L2 can be performed. That is, even in a case where the total load exceeds the second load threshold L2, the required power can be supplied from the first power supply apparatus 10 and the second power supply apparatus 20 without causing the storage battery 38' to be out of power. After the processing of step S511, the processing returns to step S501, and the processing unit 31 repeatedly executes similar processing.

On the other hand, in a case where the processing unit 31 determines that there is no reserve power in the output power in the determination of step S510 (S510—No), the processing proceeds to step S512.

The processing of step S512 is similar to the processing of step S509, and in the power generation control system 1, a state in which only the first power supply apparatus 10 outputs power is maintained.

In the determination in step S510, the case where there is no reserve power in the output power is a case where the possibility that the output power of the first power supply apparatus 10 exceeds the second load threshold L2 indicating the upper limit load is high. In order to be able to quickly supply power from the second power supply apparatus 20 in a case where the second load threshold L2 is exceeded, the state in which only the first power supply apparatus 10 outputs power is maintained without shifting the second power supply apparatus 20 to the charging mode (S512). Accordingly, even in a case where the total load exceeds the second load threshold L2, it is possible to supply necessary power from the first power supply apparatus 10 and the second power supply apparatus 20 without causing a delay in power supply from the second power supply apparatus 20. After the processing of step S512, the processing returns to step S501, and the processing unit 31 repeatedly executes similar processing.

On the other hand, in a case where the processing unit 31 determines that the calculated total load (the load level of the total load) exceeds the second load threshold L2 in the determination of step S508 (S508—No), the processing proceeds to step S513.

In step S513, the processing unit 31 of the first power supply apparatus 10 selects the first power supply apparatus 10 and the second power supply apparatus 20 as the power supply apparatuses corresponding to the load level. The processing unit 31 generates a control signal so as to output power from the first power supply apparatus 10 (own apparatus). In addition, the processing unit 31 of the first power supply apparatus 10 generates a control signal for generating power to the second power supply apparatus 20, and transmits the generated control signal to the second power supply apparatus 20 via the I/F unit 33. The processing unit 31 of the second power supply apparatus 20 controls the operation of the second power supply apparatus 20 based on the control signal received from the first power supply apparatus 10 via the I/F unit 33, and generates power. By the processing of this step, in the power generation control system 1, the first power supply apparatus 10 and the second power supply apparatus 20 output power. After the processing of step S513, the processing returns to step S501, and the processing unit 31 repeatedly executes similar processing.

According to the processing in the first control mode, it is possible to preferentially select the second power supply apparatus 20 excellent from the viewpoint of running cost and quietness in the range from the load is not connected (no load) and equal to or less than the first load threshold L1.

In the range of exceeding the first load threshold L1 and equal to or less than the second load threshold, the first power supply apparatus 10 excellent from the viewpoint of running cost can be preferentially selected. In a range exceeding the second load threshold, the first power supply apparatus 10 and the second power supply apparatus 20 can be selected as power supply apparatuses corresponding to the load level. By controlling to output power from both the first power supply apparatus 10 and the second power supply apparatus 20, it is possible to supply power corresponding to the total load exceeding the upper limit of the output power of the first power supply apparatus 10.

[Processing in Second Control Mode]

(Selection of Power Supply Apparatus)

Figure 8:
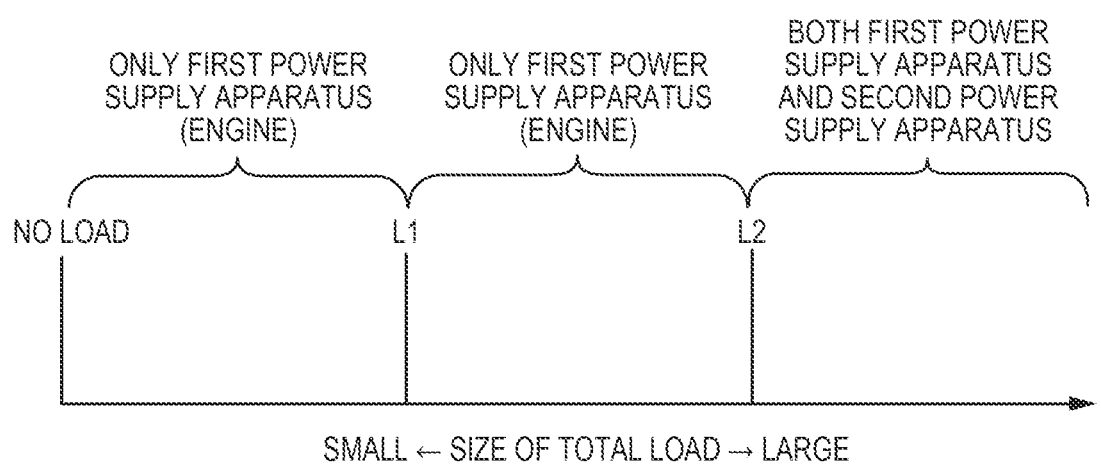
FIG. 8 is a diagram illustrating selection of a power supply apparatus according to a magnitude of a total load.

FIG. 8 is a diagram illustrating selection of the power supply apparatus according to the magnitude of the total load in the second control mode. In FIG. 8, L1 and L2 are thresholds of a load for selecting the power supply apparatus. L1 is a first load threshold, and L2 is a second load threshold larger than the first load threshold L1 (L2>L1). The settings of L1 and L2 are the same as those in FIG. 6.

The first load threshold L1 indicates a load branch point at which the magnitude relationship of the running cost changes between the first power supply apparatus 10 and the second power supply apparatus 20, and the second load threshold L2 indicates an upper limit load of the output power of the first power supply apparatus 10.

In the second control mode, only the first power supply apparatus 10 is selected in a range where the total load is equal to or less than the first load threshold L1 from a range where no load is connected (no load). In addition, only the first power supply apparatus 10 is selected in a range the total load is from the first load threshold L1 to the second load threshold L2 or less. In a range where the total load exceeds the second load threshold L2, both the first power supply apparatus 10 and the second power supply apparatus 20 are selected. In the first control mode, only the second power supply apparatus 20 is selected in a range from no load to the first load threshold L1 or less, but in the second control mode, only the first power supply apparatus 10 is selected in a range from no load to the first load threshold L1 or less, which is different from the first control mode and the second control mode.

(Flow of Processing in Second Control Mode)

Figure 7:
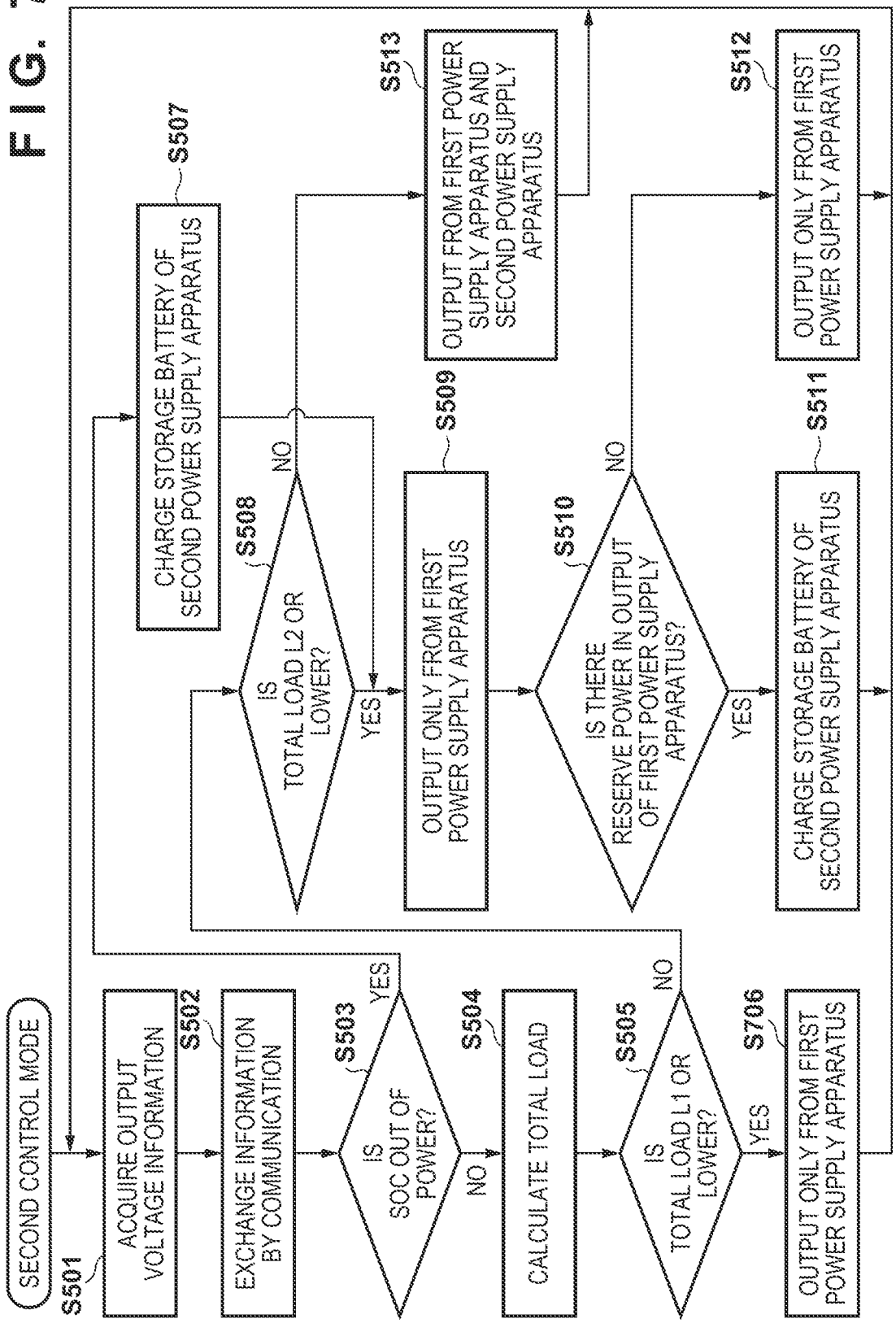
FIG. 7 is a diagram for illustrating a flow of processing in a second control mode.

FIG. 7 is a diagram for illustrating a flow of processing in a first control mode. In the present embodiment, as described in the setting processing example of the control mode in FIG. 4, the first power supply apparatus 10 functions as the master power supply apparatus (master generator), and the second power supply apparatus 20 functions as the slave power supply apparatus (slave generator). The processing unit 31 of the master power supply apparatus (first power supply apparatus 10) mainly performs the present processing. The flow of processing in the second control mode is similar to the processing in the first control mode described with reference to FIG. 5, and the same step numbers as those in FIG. 5 are assigned to the similar processing, and description thereof is omitted.

In step S505, the processing unit 31 compares the total load calculated in step S504 with the first load threshold L1, and in a case of determining that the calculated total load (load level of the total load) is equal to or less than the first load threshold L1 (S505—Yes), the processing proceeds to step S706.

In step S706, the processing unit 31 of the first power supply apparatus 10 selects the first power supply apparatus 10 as the power supply apparatus corresponding to the load level and generates a control signal to output power from the first power supply apparatus 10 (own apparatus). In addition, the processing unit 31 of the first power supply apparatus 10 generates a control signal for stopping the generation of power by the second power supply apparatus 20, and transmits the generated control signal to the second power supply apparatus 20 via the I/F unit 33. The processing unit 31 of the second power supply apparatus 20 controls the operation of the second power supply apparatus 20 based on the control signal received from the first power supply apparatus 10 via the I/F unit 33, and stops the generation of power. By the processing of this step, in the power generation control system 1, only the first power supply apparatus 10 outputs power. After the processing of step S706, the processing returns to step S501, and the processing unit 31 repeatedly executes similar processing.

Although the second power supply apparatus 20 including the storage battery 38' (battery) is superior to the running cost of the first power supply apparatus 10 from the viewpoint of the running cost and the quietness (FIG. 9A) in the range from the load is not connected (no load) and equal to or less than the first load threshold L1, according to the processing of the second control mode, the output power of the first power supply apparatus 10 including the engine generator 38 can be preferentially selected.

In the range of exceeding the first load threshold L1 and equal to less than the second load threshold, it is possible to preferentially select the first power supply apparatus excellent from the viewpoint of running cost while preferentially selecting the output power.

In a range exceeding the second load threshold, the first power supply apparatus 10 and the second power supply apparatus 20 can be selected as power supply apparatuses corresponding to the load level. By controlling to output power from both the first power supply apparatus 10 and the second power supply apparatus 20, it is possible to supply power corresponding to the total load exceeding the upper limit of the output power of the first power supply apparatus 10.

Summary of Embodiments

Configuration 1. A power generation control system of the embodiment is a power generation control system (for example, 1) including a first power supply apparatus (for example, 10) and a second power supply apparatus (for example, 20) capable of supplying power to electrical equipment, the power generation control system including:

a setting unit (for example, 31) configured to set a control mode corresponding to a use condition of a user who uses the first power supply apparatus and the second power supply apparatus;

a calculation unit (for example, 31) configured to calculate a total load obtained by adding output power of the first power supply apparatus and output power of the second power supply apparatus;

a determination unit (for example, 31) configured to determine a load level of the total load based on a comparison between the total load and a load threshold; and a control unit (for example, 31) configured to select a power supply apparatus corresponding to the load level among the first power supply apparatus and the second power supply apparatus based on the control mode, and cause the power supply apparatus to supply power.

According to the embodiment of Configuration 1, the power supply apparatus corresponding to the load level can be selected based on the control mode corresponding to the use condition of the user, and power can be supplied from the selected power supply apparatus.

Configuration 2. In the embodiment, the first power supply apparatus includes an engine generator (38) as a power source, and the second power supply apparatus includes a storage battery (38') as a power source.

According to the embodiment of Configuration 2, regarding the power supply apparatuses with different power sources, a power supply apparatus corresponding to a load level can be selected based on a control mode corresponding to a use condition of a user and power can be supplied from the selected power supply apparatus.

Configuration 3. In the embodiment, a storage unit (for example, 32) configured to store information of the first power supply apparatus and the second power supply apparatus further included, in which the storage unit stores a cost of fuel for driving the engine generator and a conversion efficiency for converting the fuel into electricity as information regarding the first power supply apparatus and stores a cost required for charging the storage battery and a charge-discharge efficiency of the storage battery as information regarding the second power supply apparatus.

Configuration 4. In the embodiment, the control mode includes a first control mode in which running cost and quietness are prioritized and a second control mode in which output power is prioritized, and the setting unit calculates a running cost of the first power supply apparatus by using the cost of fuel for driving the engine generator and a conversion efficiency for converting the fuel into electricity acquired from the storage unit, and calculates a running cost of the second power supply apparatus using the cost required for charging the storage battery and the charge-discharge efficiency of the storage battery acquired from the storage unit.

According to the embodiments of Configurations 3 and 4, the running costs of the first power supply apparatus 10 and the second power supply apparatus 20 required for selecting the power supply apparatus can be acquired based on the information stored in the storage unit 32.

Configuration 5. In the embodiment, the load threshold includes a first load threshold (for example, L1) indicating a load branch point at which a magnitude relationship of a running cost changes between the first power supply apparatus and the second power supply apparatus, and a second load threshold (for example, L2) indicating an upper limit load of the output power of the first power supply apparatus.

Configuration 6. In the embodiment, in a range equal to or less than the first load threshold, a running cost of the second power supply apparatus is set to be lower than a running cost of the first power supply apparatus, and in a range exceeding the first load threshold and equal to or less than the second load threshold, the running cost of the first power supply apparatus is set to be lower than the running cost of the second power supply apparatus.

According to the embodiments of Configurations 5 and 6, it is possible to specify the relative relationship regarding the levels of the running cost of the first power supply apparatus and the running cost of the second power supply apparatus in a range determined by the load threshold (first load threshold, second load threshold).

Configuration 7. In the embodiment, in a case where the first control mode is set in a range in which the load level of the total load is equal to or less than the first load threshold, the control unit selects the second power supply apparatus (for example, FIG. 6, no load<total load≤L1).

Configuration 8. In the embodiment, in a case where the first control mode is set in a range in which the load level of the total load exceeds the first load threshold and is equal to or less than the second load threshold, the control unit selects the first power supply apparatus (for example, FIG. 6, L1<total load≤L2).

Configuration 9. In the embodiment, in a case where the first control mode is set in a range in which the load level of the total load exceeds the second load threshold, the control unit selects the first power supply apparatus and the second power supply apparatus (for example, FIG. 6, L2<total load).

Configuration 10. In the embodiment, in a case where the total load changes from a load lower than that of the first load threshold to a load higher than that of the first load threshold and equal to or lower than that of the second load threshold during the operation in the first control mode, the control unit switches selection from the second power supply apparatus to the first power supply apparatus (for example, FIG. 6 and FIG. 9A).

According to the embodiments of Configurations 7 to 10, a power supply apparatus corresponding to a load level can be selected based on a first control mode corresponding to a use condition of a user and power can be supplied from the selected power supply apparatus.

Configuration 11. In the embodiment, in a case where the selection is switched, the control unit sets an overlapping time in which a state in which power is supplied from the second power supply apparatus and a state in which power is supplied from the first power supply apparatus overlap with each other (for example, 905 of FIG. 9B).

Configuration 12. In the embodiment, the control unit maintains power supply from the second power supply apparatus until the overlapping time elapses after power is supplied from the first power supply apparatus.

Configuration 13. In the embodiment, the control unit sets the overlapping time according to a load difference value (for example, 906 of FIG. 9B) acquired by a difference between a load higher than that of the first load threshold and equal to or lower than that of the second load threshold and a load lower than that of the first load threshold.

According to the embodiments of Configurations 11 to 13, by setting the overlapping time 905, when the selection is switched from the second power supply apparatus 20 to the first power supply apparatus 10, a state in which the output power from the power generation control system 1 temporarily becomes zero can be suppressed, and power can be stably supplied.

Configuration 14. In the embodiment, in a case where the second control mode is set in a range in which the load level of the total load is equal to or less than the first load threshold, the control unit selects the first power supply apparatus (for example, FIG. 8, no load<total load≤L1).

Configuration 15. In the embodiment, in a case where the second control mode is set, in a range in which the load level of the total load exceeds the first load threshold and is equal to or less than the second load threshold, the control unit selects the first power supply apparatus (for example, FIG. 8, L1<total load≤L2).

Configuration 16. In the embodiment, in a case where the second control mode is set in a range in which the load level of the total load exceeds the second load threshold, the control unit selects the first power supply apparatus and the second power supply apparatus (for example, FIG. 8, L2<total load).

According to the embodiments of Configurations 14 to 16, a power supply apparatus corresponding to a load level can be selected based on a second control mode corresponding to a use condition of a user and power can be supplied from the selected power supply apparatus.

Configuration 17. In the embodiment, when a reserve power difference value acquired by a difference between an output power of the first power supply apparatus and the second load threshold is equal to or larger than a predetermined value, the control unit determines that the output power has a surplus capacity, and shifts the state of the second power supply apparatus from a stop mode in which power generation is stopped to a charging mode for performing the charging in order to charge the storage battery.

According to the embodiment of Configuration 17, by performing charging on the second power supply apparatus 20 side (S511) while outputting power on the first power supply apparatus 10 side (S509), preparation for supplying power required in a case where the total load exceeds the second load threshold L2 can be performed. That is, even in a case where the total load exceeds the second load threshold L2, the required power can be supplied from the first power supply apparatus 10 and the second power supply apparatus 20 without causing the storage battery 38' to be out of power.

Configuration 18. A power generation control method of the embodiment is a power generation control method in a power generation control system (for example, 1) including a first power supply apparatus (for example, 10) and a second power supply apparatus (for example, 20) capable of supplying power to electrical equipment, the power generation control method including:

a setting process (for example, S402 of FIG. 4) of causing a setting unit (for example, 31) to set a control mode corresponding to a use condition of a user who uses the first power supply apparatus and the second power supply apparatus;

a calculation process (for example, S504 of FIG. 5 or 7) of causing a calculation unit (for example, 31) to calculate a total load obtained by adding output power of the first power supply apparatus and output power of the second power supply apparatus;

a determination process (for example, S505 or S508 of FIG. 5 or 7) of causing a determination unit (for example, 31) to determine a load level of the total load based on a comparison between the total load and a load threshold; and a control process (for example, S506 of FIG. 5, S706 of FIG. 7, or S509 or S513 of FIG. 5 or FIG. 7) of causing a control unit (for example, 31) to select a power supply apparatus corresponding to the load level among the first power supply apparatus and the second power supply apparatus based on the control mode, and causing the power supply apparatus to supply power.

According to the embodiment of Configuration 18, a power supply apparatus corresponding to a load level can be selected based on a control mode corresponding to a use condition of a user and power can be supplied from the selected power supply apparatus.

The invention is not limited to the foregoing embodiments, and various variations/changes are possible within the spirit of the invention.

What is claimed is:

1. A power generation control system including a first power supply apparatus and a second power supply apparatus capable of supplying power to electrical equipment, the power generation control system comprising:
a setting unit configured to set a control mode corresponding to a use condition of a user who uses the first power supply apparatus and the second power supply apparatus;
a calculation unit configured to calculate a total load obtained by adding output power of the first power supply apparatus and output power of the second power supply apparatus;
a determination unit configured to determine a load level of the total load based on a comparison between the total load and a load threshold; and
a control unit configured to select a power supply apparatus corresponding to the load level among the first power supply apparatus and the second power supply apparatus based on the control mode, and cause the power supply apparatus to supply power,
wherein the control mode includes a first control mode in which running cost and quietness are prioritized and a second control mode in which output power is prioritized.

2. The power generation control system according to claim 1, wherein the first power supply apparatus includes an engine generator as a power source, and the second power supply apparatus includes a storage battery as a power source.

3. The power generation control system according to claim 2, further comprising a storage unit configured to store information of the first power supply apparatus and the second power supply apparatus,
wherein the storage unit
stores a cost of fuel for driving the engine generator and a conversion efficiency for converting the fuel into electricity as information regarding the first power supply apparatus and stores a cost required for charging the storage battery and a charge-discharge efficiency of the storage battery as information regarding the second power supply apparatus.

4. The power generation control system according to claim 3, wherein
the setting unit
calculates a running cost of the first power supply apparatus by using the cost of fuel for driving the engine generator and a conversion efficiency for converting the fuel into electricity acquired from the storage unit, and
calculates a running cost of the second power supply apparatus using the cost required for charging the storage battery and the charge-discharge efficiency of the storage battery acquired from the storage unit.

5. The power generation control system according to claim 4, wherein the load threshold includes
a first load threshold indicating a load branch point at which a magnitude relationship of a running cost changes between the first power supply apparatus and the second power supply apparatus, and
a second load threshold indicating an upper limit load of the output power of the first power supply apparatus.

6. The power generation control system according to claim 5, wherein, in a range equal to or less than the first load threshold,
a running cost of the second power supply apparatus is set to be lower than a running cost of the first power supply apparatus, and
in a range exceeding the first load threshold and equal to or less than the second load threshold,
the running cost of the first power supply apparatus is set to be lower than the running cost of the second power supply apparatus.

7. The power generation control system according to claim 5, wherein, in a case where the first control mode is set in a range in which the load level of the total load is equal to or less than the first load threshold,
the control unit selects the second power supply apparatus.

8. The power generation control system according to claim 5, wherein, in a case where the first control mode is set in a range in which the load level of the total load exceeds that of the first load threshold and is equal to or less than that of the second load threshold,
the control unit selects the first power supply apparatus.

9. The power generation control system according to claim 5, wherein, in a case where the first control mode is set in a range in which the load level of the total load exceeds that of the second load threshold,
the control unit selects the first power supply apparatus and the second power supply apparatus.

10. The power generation control system according to claim 5, wherein, in a case where the total load changes from a load lower than that of the first load threshold to a load higher than that of the first load threshold and equal to or lower than that of the second load threshold during the operation in the first control mode,
the control unit switches selection from the second power supply apparatus to the first power supply apparatus.

11. The power generation control system according to claim 10, wherein, in a case where the selection is switched, the control unit sets an overlapping time in which a state in which power is supplied from the second power supply apparatus and a state in which power is supplied from the first power supply apparatus overlap with each other.

12. The power generation control system according to claim 11, wherein the control unit maintains power supply from the second power supply apparatus until the overlapping time elapses after power is supplied from the first power supply apparatus.

13. The power generation control system according to claim 11, wherein the control unit sets the overlapping time according to a load difference value acquired by a difference between a load higher than that of the first load threshold and equal to or lower than that of the second load threshold and a load lower than that of the first load threshold.

14. The power generation control system according to claim 5, wherein, in a case where the second control mode is set in a range in which the load level of the total load is equal to or less than the first load threshold, the control unit selects the first power supply apparatus.

15. The power generation control system according to claim 5, wherein, in a case where the second control mode is set in a range in which the load level of the total load exceeds that of the first load threshold and is equal to or less than that of the second load threshold, the control unit selects the first power supply apparatus.

16. The power generation control system according to claim 5, wherein, in a case where the second control mode is set in a range in which the load level of the total load exceeds that of the second load threshold, the control unit selects the first power supply apparatus and the second power supply apparatus.

17. The power generation control system according to claim 10, wherein, when a reserve power difference value acquired by a difference between an output power of the first power supply apparatus and the second load threshold is equal to or larger than a predetermined value, the control unit determines that the output power has a surplus capacity, and shifts the state of the second power supply apparatus from a stop mode in which power generation is stopped to a charging mode for performing the charging in order to charge the storage battery.

18. A power generation control method in a power generation control system including a first power supply apparatus and a second power supply apparatus capable of supplying power to electrical equipment, the power generation control method comprising:

setting a control mode corresponding to a use condition of a user who uses the first power supply apparatus and the second power supply apparatus;

calculating a total load obtained by adding output power of the first power supply apparatus and output power of the second power supply apparatus;

determining a load level of the total load based on a comparison between the total load and a load threshold; and selecting a power supply apparatus corresponding to the load level among the first power supply apparatus and the second power supply apparatus based on the control mode, and causing the power supply apparatus to supply power, wherein the control mode includes a first control mode in which running cost and quietness are prioritized and a second control mode in which output power is prioritized.

* * * * *